(12) United States Patent
Sobocinski et al.

(10) Patent No.: US 12,068,970 B2
(45) Date of Patent: Aug. 20, 2024

(54) MULTIPOINT ETHERNET BUS

(71) Applicant: Schneider Electric Industries SAS, Rueil Malmaison (FR)

(72) Inventors: Maxime Sobocinski, Cagnes sur Mer (FR); Philippe Wilhelm, Biot (FR); Patrice Jaraudias, Le Cannet (FR); Assane Sarr, Villeneuve Loubet (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 256 days.

(21) Appl. No.: 17/537,583

(22) Filed: Nov. 30, 2021

(65) Prior Publication Data

US 2022/0191150 A1 Jun. 16, 2022

(30) Foreign Application Priority Data

Dec. 15, 2020 (EP) .................................. 20306563

(51) Int. Cl.
*H04L 47/56* (2022.01)
*G06F 13/40* (2006.01)
*H04L 12/40* (2006.01)
*H04L 49/351* (2022.01)

(52) U.S. Cl.
CPC .......... *H04L 47/56* (2013.01); *G06F 13/4022* (2013.01); *H04L 12/40* (2013.01); *H04L 49/351* (2013.01)

(58) Field of Classification Search
CPC ....... H04L 47/56; H04L 12/40; H04L 49/351; H04L 12/28; H04L 12/46; H04L 67/12; H04L 25/0272; H04L 5/14; H04L 67/10; G06F 13/4022; G05B 2219/15119; G05B 19/054

See application file for complete search history.

(56) References Cited

U.S. PATENT DOCUMENTS

2021/0083671 A1* 3/2021 Allory .................... G21D 3/008
2022/0390979 A1* 12/2022 Xu ............................ G06F 1/12

OTHER PUBLICATIONS

Wenge, Han et al., "64-Channel Data Acquisition Module Based on MLVDS", 2018 International Conference on Intelligent Transportation, Big Data & Smart City, IEEE, Jan. 25, 2018, pp. 231-234.
"LVDS Owner's Manual, Including High-Speed CML and Signal Conditioning", Texas Instruments, Fourth Edition, 2008, pp. 1-111.

(Continued)

*Primary Examiner* — Luat Phung
(74) *Attorney, Agent, or Firm* — Locke Lord LLP

(57) ABSTRACT

An industrial system for controlling backplane communication including a cluster manager linked to Input/Output modules via a multipoint low voltage differential signaling, MLVDS, bus through passive base plates. The MLVDS bus contains a transmission line and a reception line for the cluster manager. The transmission line of the MLVDS bus is shared by the Input/Output modules for receiving data transmitted by the cluster manager. The reception line of the MLVDS bus is shared by the Input/Output modules for transmitting data to the cluster manager. The Input/Output modules are synchronized in time with the cluster manager and configured to send data on the reception line of the MLVDS bus at respective scheduled time windows.

12 Claims, 3 Drawing Sheets

(56) References Cited

OTHER PUBLICATIONS

Song, Kaichen et al., "Signal Integrity Optimization of MLVDS based Multi-master Instrument Bus", 2014 IEEE International Symposium on Electromagnetic Compatibility (EMC), IEEE, Aug. 4, 2014, pp. 433-437.
European Search Report and Search Opinion dated Jun. 9, 2021 for corresponding European Patent Application No. EP20306563.6, 8 pages.

* cited by examiner

MULTIPOINT ETHERNET BUS

FIELD OF INVENTION

The present disclosure relates generally to industrial networks and, more particularly, to systems that support multiple industrial Ethernet protocols, fieldbus protocols, and industrial application processing, and provide high performance for backplane communication for programmable logic controller in industrial architecture.

BACKGROUND

Industrial automation/control systems are employed for controlling operation of a wide variety of systems, including processes, machines, etc., and are typically adaptable to different control applications through configuration and interconnection of multiple control system components or devices, such as control modules, Input/Output (I/O) modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

A desire to integrate the business and control network structures to interconnect industrial control systems with general purpose systems, along with the evolution and development of fast Ethernet (e.g., in switch mode with full duplex capability), has allowed for Industrial Ethernet networks (e.g., such as Ethernet/IP networks that allow for direct connection of field devices to an Ethernet network) to be widely used in industrial applications. Indeed, industrial Ethernet is becoming the dominant (if not incumbent) technology in industrial automation.

As shown in FIG. 1, in a slice I/O architecture, a standalone I/O island is connected to a control device like a programmable logic controller PLC with a fieldbus like Ethernet/IP and contains a head HD driving clusters of I/O modules respectively through cluster managers CM. A cluster is a set of I/O modules IOM, up to 32 modules, physically linked together through a backplane and an I/O module IOM is a usual automation module converting electrical signals to digital values. The usual way to communicate in a cluster between the cluster manager and different modules is to use an external switch SWE that is directly connected to each of the I/O modules and to the cluster manager.

However, the external switch SWE may become cumbersome and costly in situation with space constraints and wherein the number of I/O modules is high, up to 32, rendering a real time solution an issue.

There is therefore a need for enabling an efficient communication between the I/O modules and the cluster manager respecting real time constraints with high speed communication and reliability and low-cost products.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an industrial system for controlling backplane communication, comprising:

- a cluster manager (CM) linked to Input/Output modules (IOM) via a multipoint low voltage differential signaling, MLVDS, bus through passive base plates (BP),
- wherein the MLVDS bus contains a transmission line and a reception line for the cluster manager (CM),
- wherein the transmission line of the MLVDS bus is shared by the Input/Output modules (IOM for receiving data transmitted by the cluster manager (CM),
- wherein the reception line of the MLVDS bus is shared by the Input/Output modules (IOM for transmitting data to the cluster manager (CM),
- wherein the Input/Output modules are synchronized in time with the cluster manager and configured to send data on the reception line of the MLVDS bus at respective scheduled time windows.

Advantageously, the system presents a multipoint Ethernet connection without involving a switch nor a hub and enables the communication between I/O modules and the cluster manager while respecting real time constraint and low-cost products by the use of passive base plates and MLVDS bus. The use of MLVDS bus in passive base plates allows a high level of reliability with no active component in the backplane and minimized risk of failure and offers a low-cost solution a no external switch is needed.

The split of the reception and transmission lines of the MLVDS bus creates, from the cluster manager point of view, a full duplex communication at 100 Mb/s or more.

In an embodiment, the data are sent in Ethernet frames.

In an embodiment, the data are formatted according to the Open Platform Communications United Architecture.

In an embodiment, wherein the cluster manager and each of the Input/Output modules comprise respective switches to transmit and receive data on the MLVDS bus.

In an embodiment, said switches are Time Sensitive Networking switches.

The Time Sensitive Networking switches allow to create a time shared multipoint communication from the I/O modules to the cluster manager without using an external switch. The usage of Time Sensitive Networking switches brings determinism and high level of performance and openness (standard Ethernet) for the data transmission.

In an embodiment, said switches comprise respective clocks that are synchronized based on Precision Time Protocol.

In an embodiment, the cluster manager transmits data in frames on the transmission line of the MLVDS bus at scheduled time windows to all Input/Output modules.

In an embodiment, each Input/Output module only processes data addressed to it in a frame and drops the other data of the frame.

In an embodiment, data can be Input/Output data or service data, wherein Input/Output data correspond to machine data comprising values of the inputs and outputs of an Input/Output module, and service data relate to information on a service coming from a device connected to the I/O module.

In an embodiment, Input/Output data are sent in a deterministic latency way to the cluster manager in static time windows.

In an embodiment, service data are sent in a best effort way to the cluster manager in dynamic time windows. The use of dynamically assigned time window for services communication allows to optimize the bandwidth usage on the MLVDS bus.

In an embodiment, the switches are implemented with the IEEE 802.1Qbv time-aware scheduler to schedule the static time windows and dynamic time windows.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
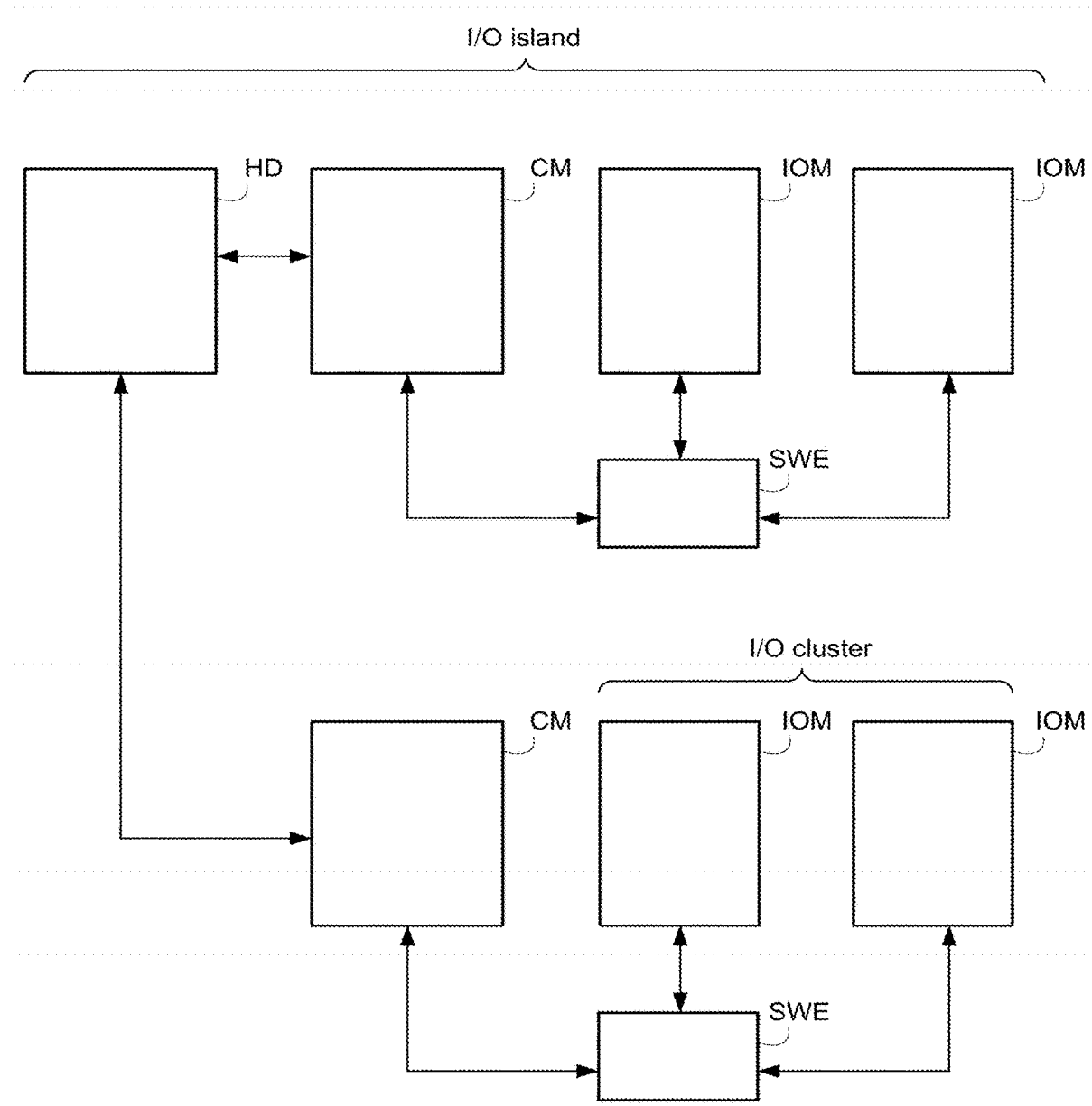
FIG. 1 shows a schematic block diagram of an industrial communication system using an external switch between a cluster manager and I/O modules.
Figure 2:
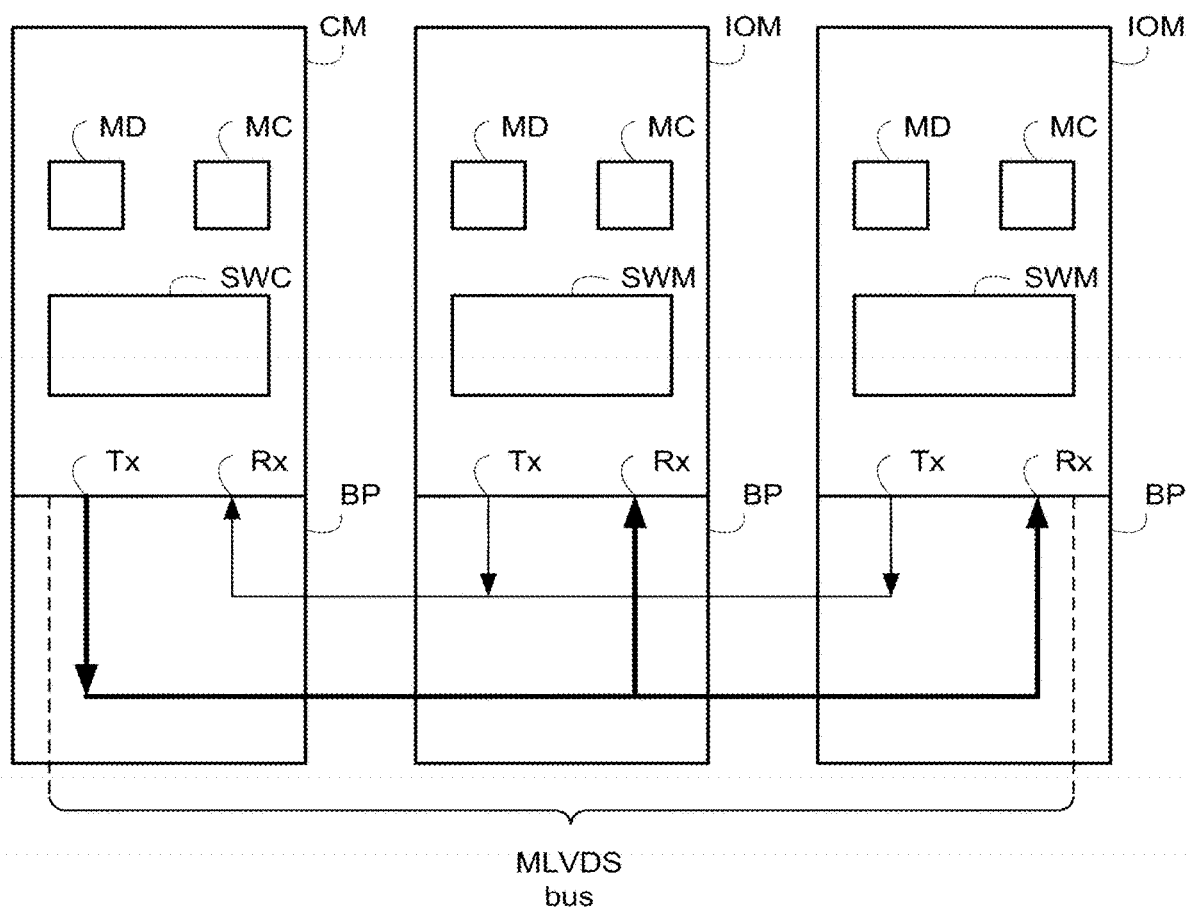
FIG. 2 shows a schematic block diagram of an industrial communication system using a multipoint low voltage differential signaling bus in a multipoint backplane according to one embodiment of the invention.

Referring to FIG. 2, an industrial communication system comprises a cluster manager CM, a set of I/O modules IOM, base plates BP and a multipoint low voltage differential signaling (MLVDS) bus composed of two MLVDS lines.

The cluster manager CM is able to manage communication with a set of I/O modules IOM, up to 32, via the MLVDS bus, and optionally with another cluster manager via Ethernet and CAN (Controller Area Network) bus. The cluster manager CM is driven by a head that can drive other cluster managers. In one embodiment, the cluster manager is included in the head connected via a fieldbus to a control device like a PLC. In one embodiment, the head is also included in the PLC.

An I/O module IOM can include Analog to Digital Converter (ADC) and Digital to Analog Converter (DAC) for connecting to sensors and the real world, communications modules, digital inputs and outputs, relays, and more. An I/O module communicates with the control manager CM through the MLVDS bus with adapted packet formats.

The base plates BP are respectively associated with the I/O modules that are plugged into them. The base plates BP may be designed to form a backplane for the set of I/O modules, each combination of base plate and associated I/O module forming a slice of the backplane.

Each base plate is a passive base plate that offers no active bus driving circuitry, any desired arbitration logic being placed on the I/O module. A passive base plate is thus expected is expected to not have a single point of failure (SPOF).

The MLVDS bus is a physical medium configured to be coupled to multiple I/O modules and the cluster manager and provides a multi-drop capability. The MLVDS bus is designed to allow transmission of data at a rate of more than 100 Mbps. For example, the switch of an I/O module or the cluster manager is connected to the MLVDS bus through a reduced gigabit media-independent interface (RGMII).

Figure 3:
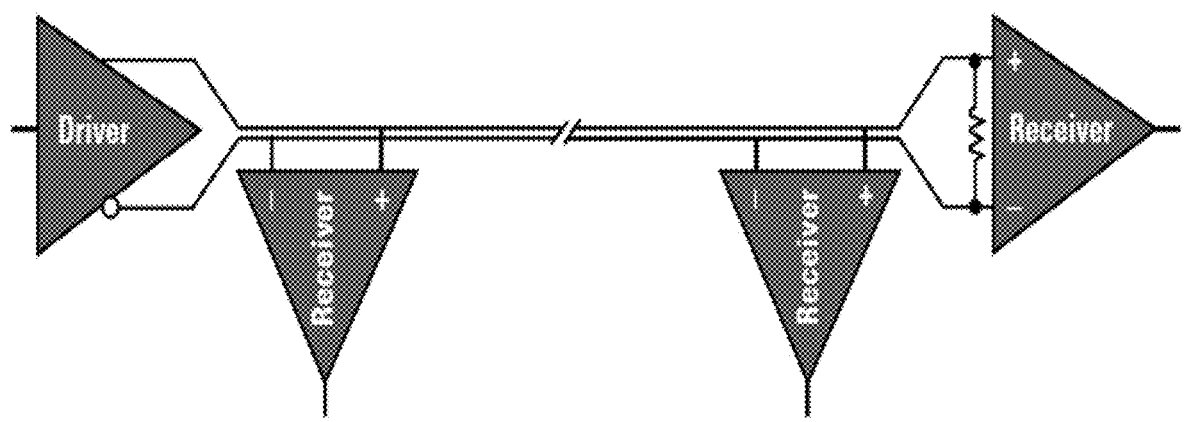
FIG. 3 shows a schematic block diagram of a multipoint low voltage differential signaling system.

FIG. 3 illustrates the concept of MLVDS bus and shows a multi-point connectivity involving one driver and three receivers. There is a single driver connected to multiple receivers on a same lane.

Since LVDS is a differential signaling system, it transmits information as the difference between the voltages on a pair of lines; these two line voltages are compared at a LVDS receiver receiving a LVDS signal. In a typical implementation, a LVDS transmitter injects a constant current into the lines, with the direction of current determining the logic level being communicated. The current passes through a termination resistor (matched to the cable's characteristic impedance to reduce reflections) at the receiving end, and then returns in the opposite direction via the other line. The LVDS receiver senses the polarity of the voltage across the resistor to determine the logic level being communicated. This provides for the transmission of binary data MLVDS technology allows multipoint connection of up to 32 nodes and signaling rates to 500 Mbps. The common-mode range of MLVDS likely limits application to cables of 30 meters or less but depends upon the environment.

According to one embodiment for a transmission line of the MLVDS bus for the cluster manager, the single driver corresponds to the cluster manager and the receivers correspond to I/O modules. A reception line of the MLVDS bus for the cluster manager is built on a similar way, wherein multiple I/O modules replace the receivers as drivers and the cluster manager replaces the driver as receiver. The cluster manager is the only driver in a transmission line and is the only receiver in a reception line.

The MLVDS bus with the transmission and reception lines allows to create a full duplex communication between the driver and a receiver up to 200 Mbps, conformed to TIA/EIA-899 standard.

Referring back to FIG. 2, the MLVDS bus comprises a transmission line for the cluster manager CM as driver at a terminal Tx. The transmission line is shared with the I/O modules IOM as receivers at respective terminals Rx. The MLVDS bus comprises a reception line for the cluster manager CM as receiver at a terminal Rx. The reception line is shared with the I/O modules IOM as drivers at respective terminals Tx.

The cluster manager CM and each of the I/O module contain a switch, a MAC driver MD and a microcontroller MC.

The switch SWC of the cluster manager CM is able to handle Ethernet frames exchanged with the I/O modules and with other cluster managers and/or with the head if the cluster manager is not included in this latter. The switch SWM of an I/O module is able to handle Ethernet frames exchanged with the cluster manager.

The MAC driver MD generally operates to control access to the MLVDS bus. For example, the MAC driver can control whether the switch is transmitting or receiving data and clock signals, and more specifically which ports of the switch are configured to send or received data. For example, a port of the switch may be configured to send a specific frame at a schedule time window.

The switch SWM and the MAC driver MD of an I/O module share a same clock. Also the switch SWC and the MAC driver MD of the cluster manger share a same clock. It is assumed that all the clocks are synchronized, for example by a Generalized Precision Time Protocol (gPTP) which employs UDP messages to establish a hierarchy of clocks and synchronize time in a gPTP domain which the cluster manager and the I/O modules belong to. For real-time communication with non-negotiable time boundaries for end-to-end transmission latencies, all switches have a common time reference as their clocks are synchronizes among each other.

All the switches are defined as Time Sensitive Networking (TSN) switches which allow a full duplex communication between the cluster manager and an I/O module without any collision in the data traffic. Furthermore, the switches are programmable with OPC-UA (Open Platform Communications United Architecture) frame summation acceleration. The OPC-UA is a data exchange standard for industrial communication and is a platform independent service-oriented architecture that integrates all the functionality of the individual OPC Classic specifications into one extensible framework. Generally, with the OPC-UA frame summation acceleration, a switch is able to transmit an Ethernet frame containing data for all nodes (cluster manager or I/O modules) connected to the MLVDS bus. The Ethernet frame passes through all nodes in sequence and when it arrives at the last node on a trunk, the frame is turned back again. The nodes process the information in the frame as it passes through in one direction. Each node reads out data addressed to it on the fly, and inserts response data back into the frame.

More especially, the TSN switches are implemented with the IEEE 802.1Qbv time-aware scheduler and are aware of cycle times for control traffic. The TSN switch is able to block non-control traffic during particular time windows to ensure that an egress port for control stream is idle when control traffic is expected. The TSN switch can configure each egress port to have a separate schedule.

The IEEE 802.1Qbv time-aware scheduler is designed to separate the communication of Ethernet frames on the MLVDS bus into fixed length, repeating time cycles. Within these cycles, different time windows can be configured to be assigned to one or several priorities. By the scheduling of time windows, it is possible to grant exclusive use—for a limited time—to the transmission line for specific data traffic, that needs for example transmission guarantees and can't be interrupted. The scheduling of time windows is based on a time-division multiple access (TDMA) scheme. By establishing virtual communication channels for specific time periods, time-critical communication can be separated from non-critical background traffic.

The microcontroller MC is able to process the content of the frames and may include a main CPU Platform with an ARM® Cortex™ M7 for example and a Secure CPU Platform with an ARM® Cortex™ M33 for example.

The microcontroller MC of the cluster manager CM further contains a packet processor that manages the Ethernet frames coming from the I/O modules through the switch SWC The packet processor is able to extract the payload of each Ethernet frame, verify the signature of each payload, concatenate all payloads in one payload in only one concatenated Ethernet frame, calculate a new signature and send the concatenated Ethernet frame to a processing unit.

The traffic of data can comprise at least three types of data: I/O data, service data and control data. The I/O data correspond to machine data and may comprise mainly the values of the inputs and outputs of the I/O module. The service data may relate to information on a service coming from a device connected to the I/O module. For example, the service data may be handled by an application able to provide information for a specific request, like a status request, a log error request. The control data are processed to manage the behavior of the switch, especially to trigger to exchange of service data.

The I/O data traffic is scheduled in static time windows and offer deterministic latency. The service data traffic is scheduled in dynamic time windows according to a best effort way. There is thus a dual data flow management on a same transmission laine of the MLVDS bus with I/O data traffic with deterministic latency and service data in best effort. The control data is scheduled in static time windows, especially to command opening and closing of a gate for a traffic queue of service data.

The switch manages different traffic queues according to the concept of Time-Aware Shaping (TAS) introduced by IEEE 802.1Qbv standard. Time-Aware Shaping enables determinism by dividing traffic in different preconfigured time-slots configured in a Gate-Control-Lists (GCL). The time aware shaper consists different traffic queues. Each queue is associated with a gate and has a transmission selection algorithm which selects the next packet transmitted from the queue. The queue can be organized in first in first out (FIFO). The state of a gate can either be open or close, and only open gates can transmit packets. A time aware gate opens and closes according to its configured time. The schedule of the gate states is specified in the GCL. Each entry of the list consists of a set of gate states and their duration.

In one embodiment, some traffic queues are dedicated to I/O data and are scheduled to be transmitted in static time windows, with deterministic latency. Some other traffic queues are dedicated to service data and are scheduled to be transmitted in dynamic time windows, in a best effort way.

At each time cycle, the switch commands the opening of a gate for a scheduled time window for transmitting the data in the queue associated with said gate, the other gates remaining closed. At each time cycle, a switch may send I/O data in a static time window, control data in another static time window, and potentially service data in a dynamic time window that is scheduled by the cluster manager.

From the cluster of I/O modules perspective, at each time cycle, the I/O modules transmit data on the reception line of the MLVDS bus at respective scheduled time windows. At each time cycle, the cluster manager transmits data on the transmission line of the MLVDS bus at respective scheduled time windows. All I/O modules receive the same Ethernet frame of data transmitted by the cluster manager and with the OPC-UA format of the data, each I/O module only processes the specific data addressed to it and drops the other data.

Thanks to the synchronized clocks of the switches of the I/O modules, all the I/O modules can share the reception line of the MLVDS bus to transmit I/O data at respective scheduled static time windows with deterministic latency at each time cycle. Thanks to the IEEE 802.1Qbv time-aware scheduler, at least one I/O module can transmit service data the reception line of the MLVDS bus at a scheduled dynamic time windows in a best effort way.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. An industrial system for controlling backplane communication in an industrial automation/control system, comprising:
   a cluster manager linked to Input/Output modules via a multipoint low voltage differential signaling, MLVDS, bus through passive base plates,
   wherein the MLVDS bus contains a transmission line and a reception line for the cluster manager,
   wherein the transmission line of the MLVDS bus is shared by the Input/Output modules for receiving data transmitted by the cluster manager,
   wherein the reception line of the MLVDS bus is shared by the Input/Output modules for transmitting data to the cluster manager,
   wherein the Input/Output modules are synchronized in time with the cluster manager and configured to send data on the reception line of the MLVDS bus at respective scheduled time windows,
   wherein the cluster manager and each of the Input/Output modules comprise respective MAC drivers to control access to the MLVDS bus for the cluster manager and each of the Input/Output modules, the respective MAC drivers configured to control which ports send or receive data for the cluster manager and each of the Input/Output modules, as well as which frames are sent at the scheduled time windows.

2. The industrial system according to claim 1, wherein the data are sent in Ethernet frames.

3. The industrial system according to claim 1, wherein the data are formatted according to the Open Platform Communications United Architecture.

4. The industrial system according to claim 1, wherein the cluster manager and each of the Input/Output modules comprise respective switches to transmit and receive data on the MLVDS bus.

5. The industrial system according to claim 4, wherein said switches are Time Sensitive Networking switches.

6. The industrial system according to claim 4, wherein said switches comprise respective clocks that are synchronized based on Precision Time Protocol.

7. The industrial system according to claim 4, wherein the switches are implemented with an IEEE 802.1Qbv time-aware scheduler to schedule the static time windows and dynamic time windows.

8. The industrial system according to claim 1, wherein the cluster manager transmits data in frames on the transmission line of the MLVDS bus at scheduled time windows to all Input/Output modules.

9. The industrial system according to claim 8, wherein each Input/Output module only processes data addressed to it in a frame and drops the other data of the frame.

10. The industrial system according to claim 1, wherein data can be Input/Output data or service data, wherein Input/Output data correspond to machine data comprising values of the inputs and outputs of an Input/Output module, and service data relate to information on a service coming from a device connected to the I/O module.

11. The industrial system according to claim 10, wherein Input/Output data are sent in a deterministic latency way to the cluster manager in static time windows.

12. The industrial system according to claim 10, wherein service data are sent in a best effort way to the cluster manager in dynamic time windows.

* * * * *